United States Patent [19]
Kovaletz

[11] Patent Number: 5,248,436
[45] Date of Patent: * Sep. 28, 1993

[54] METHOD FOR DISPENSING A FLUIDIC MEDIA FOR TREATMENT OF WATERBORNE SPILLED PETROLEUM

[76] Inventor: Mark P. Kovaletz, 1935 Brandon Cir., Anaheim Hills, Calif. 92807

[*] Notice: The portion of the term of this patent subsequent to Nov. 20, 2007 has been disclaimed.

[21] Appl. No.: 661,342

[22] Filed: Feb. 25, 1991

[51] Int. Cl.$^5$ .............................................. C02F 1/28
[52] U.S. Cl. ..................... 210/693; 210/924
[58] Field of Search .................. 210/693, 198.1, 241, 210/242.4, 924

[56] References Cited

U.S. PATENT DOCUMENTS

| | | | |
|---|---|---|---|
| 2,779,421 | 1/1957 | Rust | 169/1 |
| 3,036,797 | 5/1962 | Agusta | 244/137 |
| 3,044,818 | 7/1962 | Tobey | 294/81 |
| 3,485,151 | 12/1969 | Taylor | 95/12.5 |
| 3,554,468 | 1/1971 | McVicar | 244/137 |
| 3,886,067 | 5/1975 | Miranda | 210/242.4 |
| 3,936,018 | 2/1976 | Barlow | 244/136 |
| 4,090,567 | 5/1978 | Tomlinson | 169/53 |
| 4,237,237 | 12/1980 | Jarre et al. | 210/693 |
| 4,378,919 | 4/1983 | Smith | 244/118.1 |
| 4,477,289 | 10/1984 | Kurtgis | 134/34 |
| 4,589,614 | 5/1986 | Stevens | 244/136 |
| 4,971,082 | 11/1990 | Kovaletz | 134/34 |
| 4,973,361 | 11/1990 | Kovaletz | 134/34 |
| 5,009,790 | 4/1991 | Bustamante et al. | 210/924 |

OTHER PUBLICATIONS

Bauer Compressors, Inc. data sheet; Rotapac Power In—Air Out; Norfolk, Va.; no date.
California Power Systems data sheet; Rotax 503 Power Plants; San Francisco, Calif.; no date.
Empire Abrasive Equipment Corp.; Superblast Catalog; pp. 6-15, 18-20; Langhorne, Pa.; no date.
Forest Service Technology & Development Program; Foam Proportional System; USDA—Forest Service; San Dimas, Calif.; May, 1989.
Forest Service Technology & Development Program; Venturi Foam Proportioning System; USDA Forest Service; San Dimas, Calif.; Dec. 1989.
Foam Applications for Wildland & Urban Fire Management; vol. 2, No. 1; pp. 1, 4; National Wildfire Coordinating Group; 1989.
Foam Applications for Wildland & Urban Fire Management; vol. 2, No. 3; pp. 1-3; National Wildfire Coordinating Group; 1989.
Flow-Mix TM Model 500 Foam Proportioner data sheet; Robwen Inc., Los Angeles, Calif.; May 1988.
Mallory Compressed Air Foam System data sheet; The Mallory Company, Vancouver, Wash.; no date.

(List continued on next page.)

*Primary Examiner*—Ivars Cintins
*Attorney, Agent, or Firm*—Sheldon & Mak

[57] ABSTRACT

A system for controllable delivery of a suitable particulate material in dry form from a vehicle for treating waterborne spilled oil. A dispensing module of the system includes base means for defining a base, air compressor means, tank means for holding the particulate material, a feed conduit connected for pressurization by the air compressor means and having an outlet, a downwardly directed nozzle fluid connected to the outlet and supported from the base, means for feeding the particulate material from the tank means into the feed conduit whereby a stream of the material, mixed with air, is directed at high velocity from the outlet, and means for carrying the base by an airborne vehicle with the nozzle elevated above the surface level, the stream impacting and penetrating the oil. The module can be suspended below a helicopter by means of a stabilizer unit. Alternatively, the module can be suspended in registration with landing gear members of the helicopter. In a preferred configuration, the nozzle is located at the end of a downwardly sloping boom assembly of the module, the nozzle also having fore and aft adjustment capability for compensating forward movement of the helicopter.

12 Claims, 7 Drawing Sheets

OTHER PUBLICATIONS

"Cold Grinding Makes Super Slurper" from *What's Happening In Chemistry?*; pp. 26, 27; American Chemical Society; 1989.

"Would You Believe $16.67 an Hour to Scrub Rocks?" from *U.S. News & World Report;* p. 48; Apr. 17, 1989.

"A Polymer That Separates Oil From Water" from *Chemical Week;* p. 53; Apr. 20, 1989.

"Elastol Oil Recovery System"; General Technology Applications, Inc.; Manassas, Va.; 4 pages; no date.

GTA Material Safety Data Sheet; General Technology Applications, Inc.; Manassas, Va.; 2 pages; Sep. 18, 1990.

"Enhanced Oil-and-Water Separation Using High Molecular Weight Polyisobutylene" from *NLGI Spokesman* vol. LIII, No. 5; pp. 197-203; Aug. 1989.

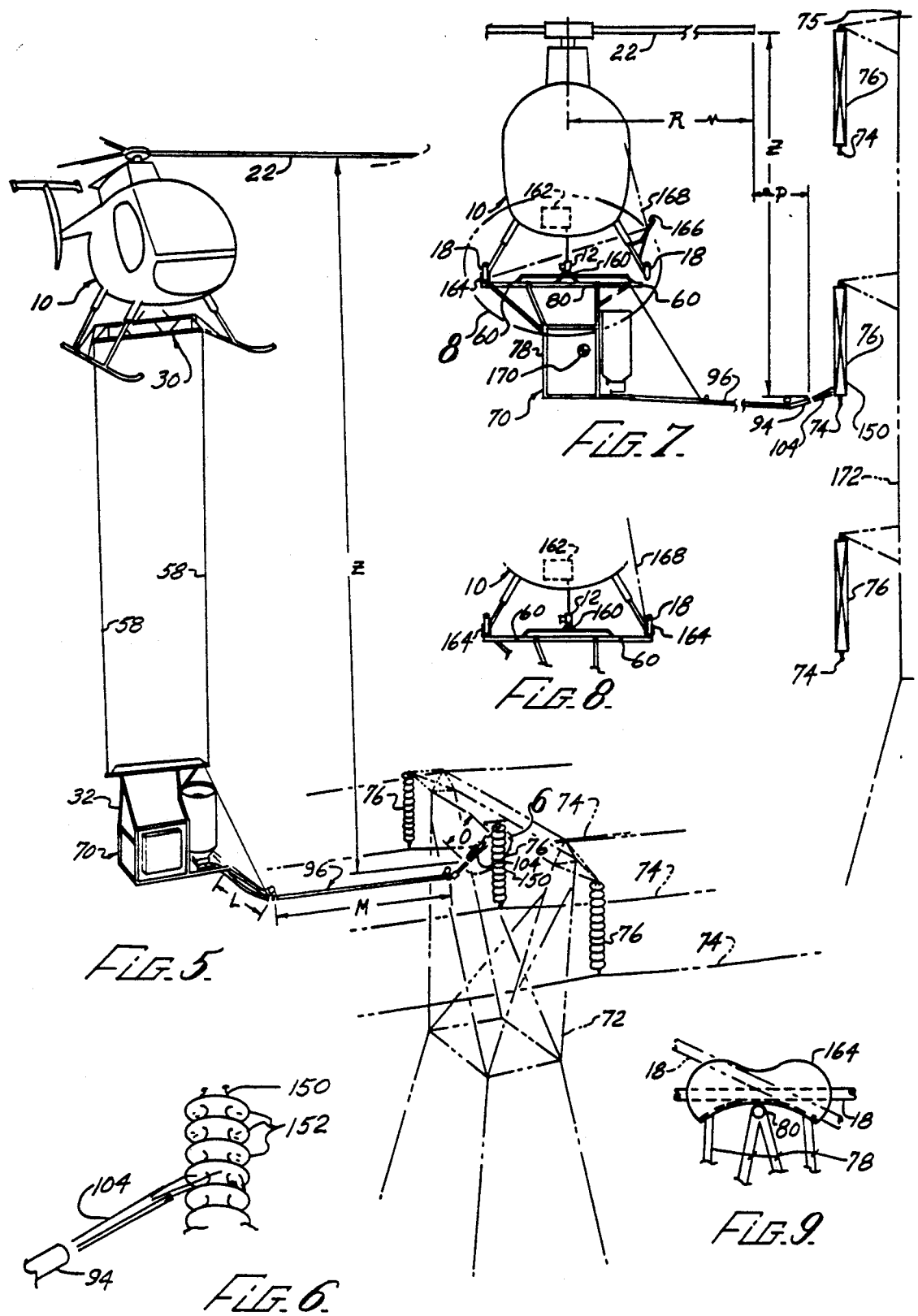

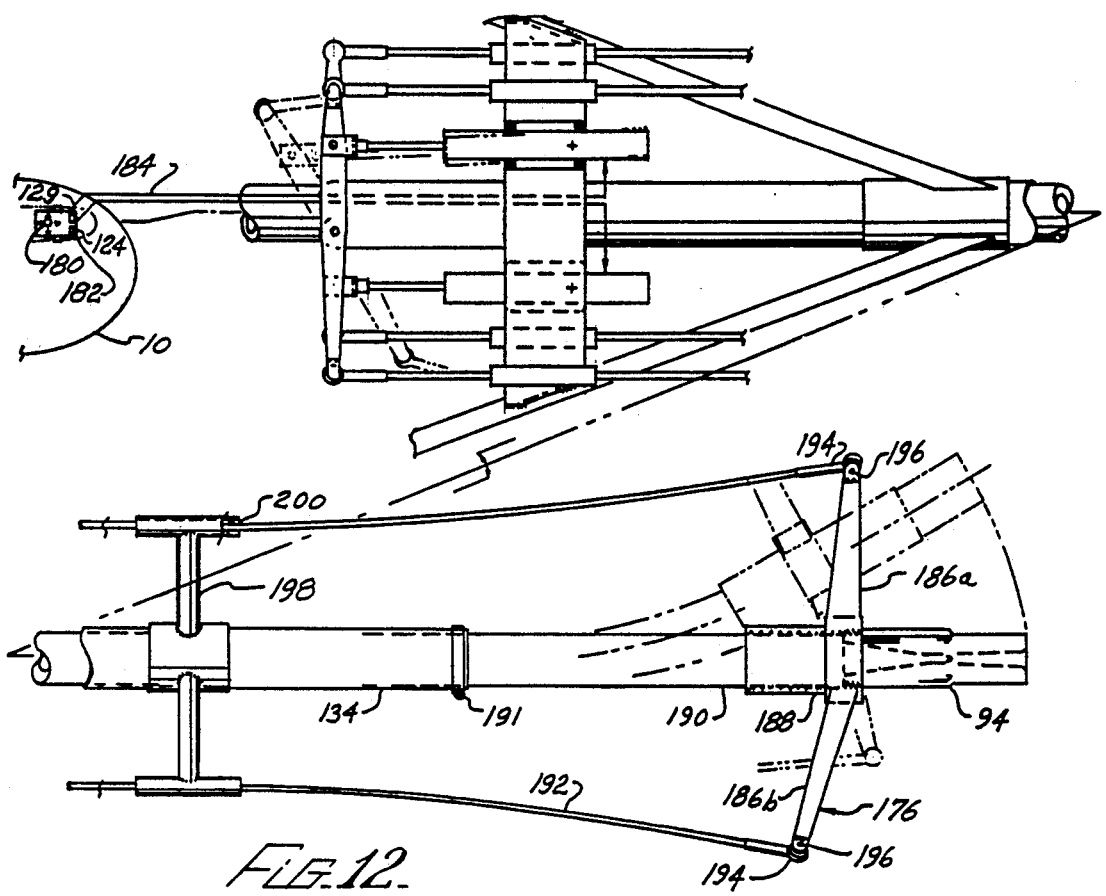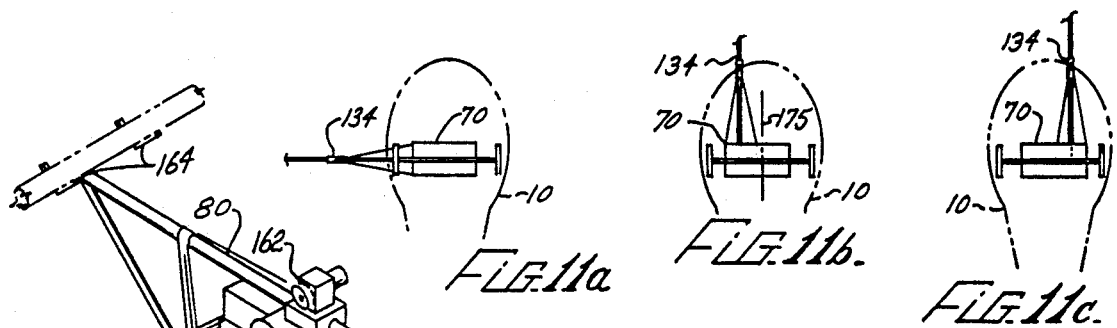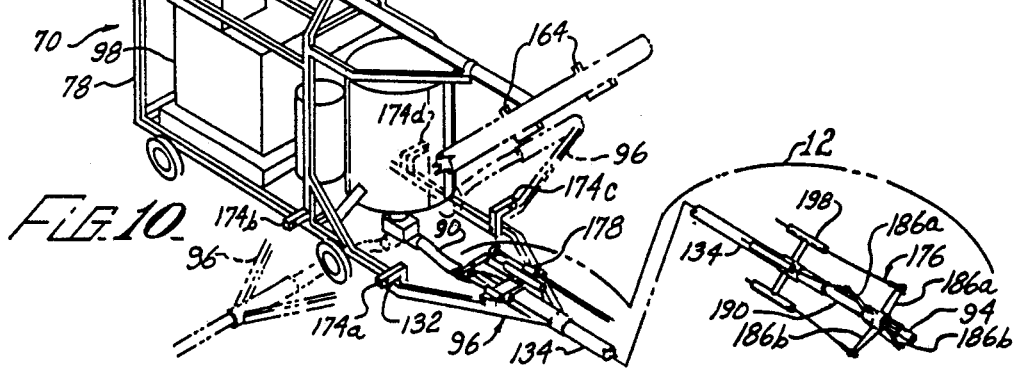

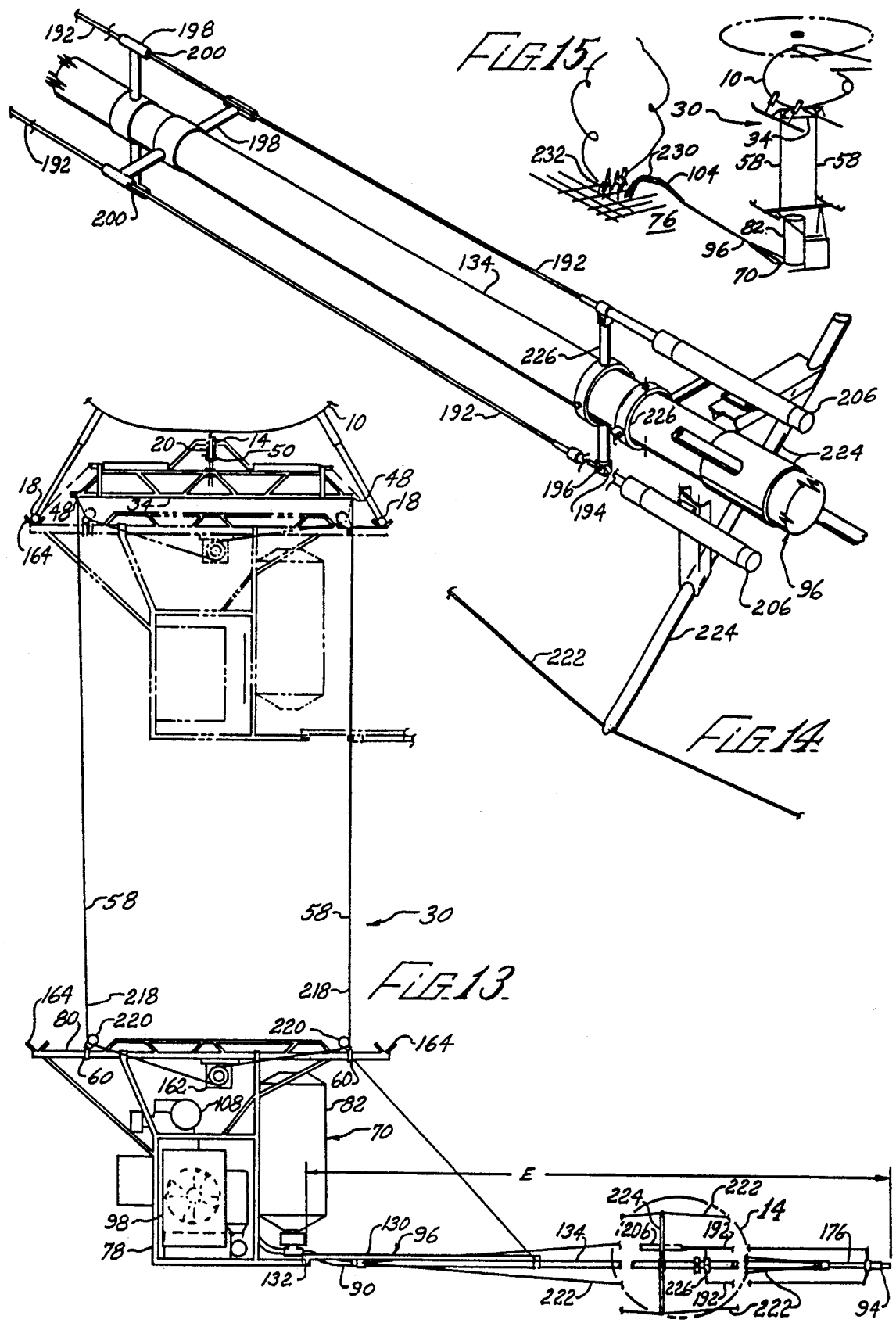

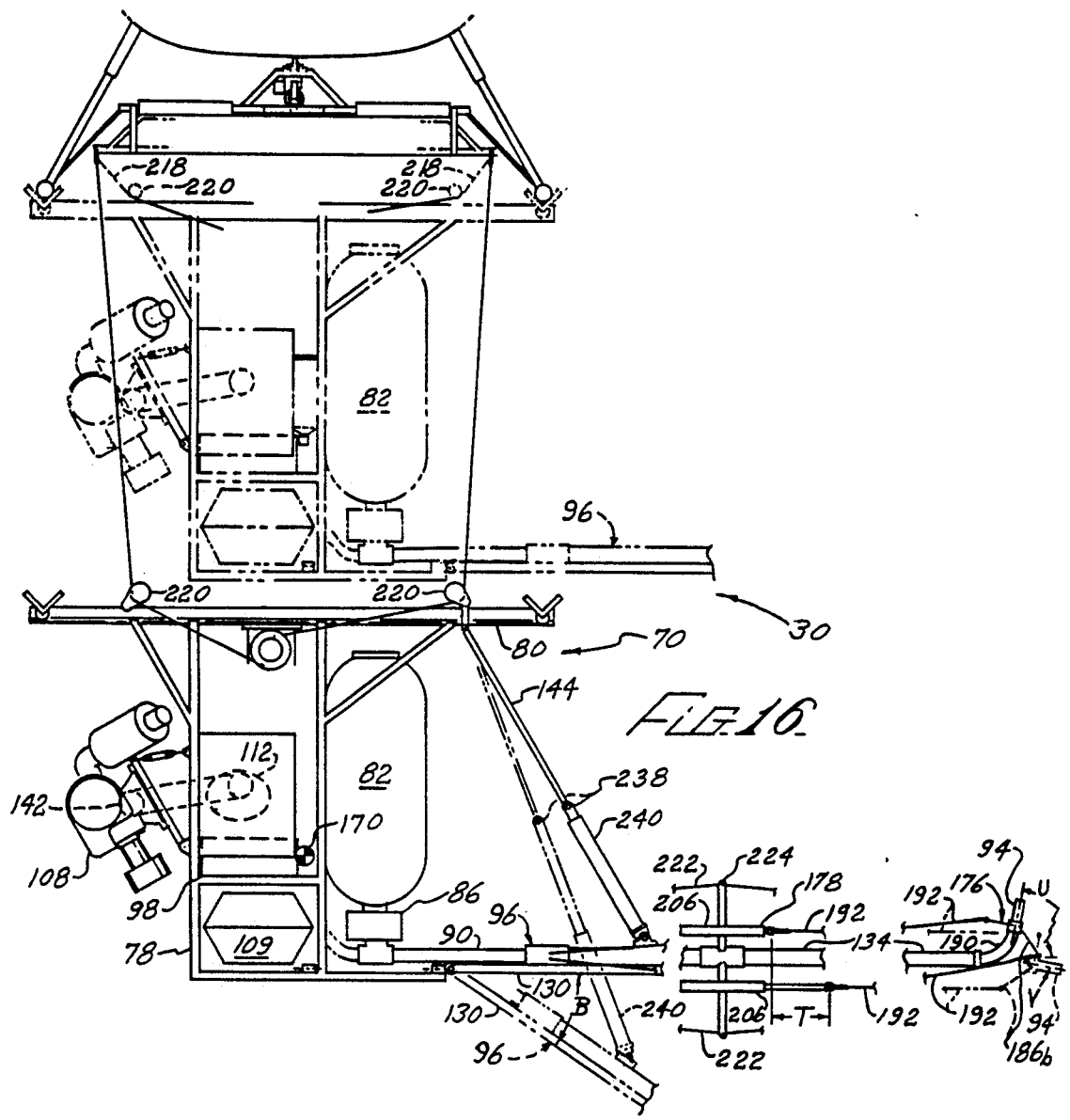

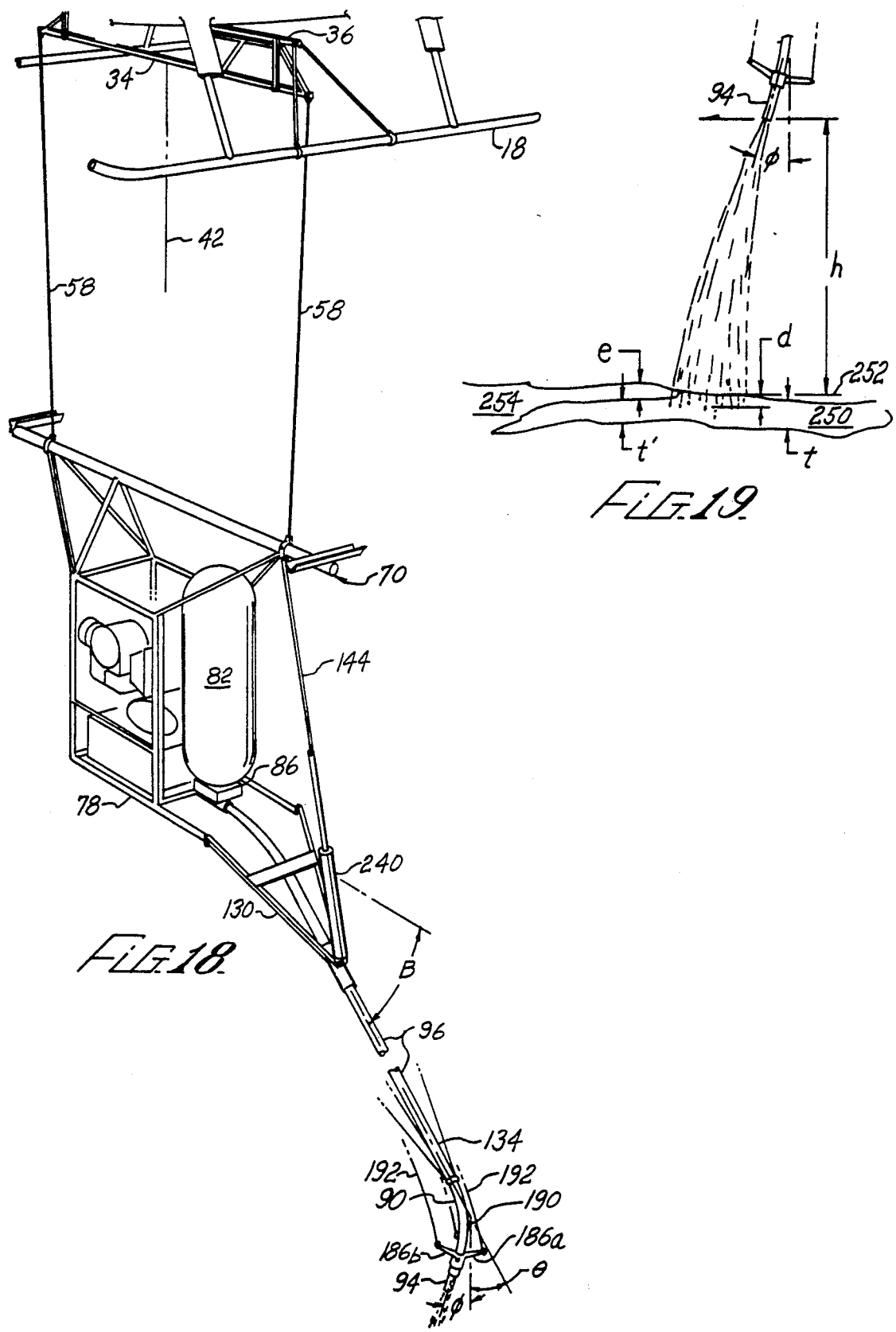

METHOD FOR DISPENSING A FLUIDIC MEDIA FOR TREATMENT OF WATERBORNE SPILLED PETROLEUM

BACKGROUND

The present invention relates to environmental damage control, and more particularly to the treatment of waterborne petroleum such as for facilitating collection and recovery thereof.

The advent of supertankers and occurrences of large oil spills in recent history have focused attention on the need for systems rapidly deployable to remote locations in such emergencies, systems that are effective in limiting damage to the environment that would otherwise be caused by the spilled oil.

One method for controlling oil spills involves the application of materials that combine with the oil to produce a substance that is more easily confined and/or collected than untreated oil. Such a material is available as ELASTOL TM pulverized polyisobutylene (PIB) from General Technology Applications, Inc., of Manassas, Va. In one known process, the material is mixed with water, and then applied to the spill, using apparatus carried by a watercraft.

A disadvantage of this process is that the watercraft is subject to fouling by oil from the spill.

It has also been proposed to dispense the material in dry form from an airborne vehicle such as a helicopter. However, attempts at such delivery have been heretofore unsuccessful because a large proportion of the material is carried away from the target area by air currents, and a preponderance of the material reaching the target is ineffective because it does not penetrate the oil. This latter condition is exacerbated by the gradual absorption of water into the oil, resulting in submergence of significant portions of the spilled oil below several inches of water.

It is also known to dispense a particulate material such as crushed walnut shells from a hovering platform for abrasively cleaning transmission line tower insulators, as disclosed in my U.S. Pat. No. 4,973,361, and further to dispense a fluidic medium such as firefighting foam from a helicopter-borne dispensing module, as disclosed in my U.S. Pat. No. 4,971,082, which is incorporated herein by this reference. One solution to the problem of dispensing the oil spill treatment material involves dispersing the material, mixed with water, from the helicopter. However, this approach requires the water to be carried by the helicopter, severely limiting the quantity of the treatment material that can be delivered on each flight of the helicopter.

Thus there is a need for a system for treating waterborne spilled oil that does not exhibit the above disadvantages.

SUMMARY

The present invention meets this need by providing an apparatus and method for controllable delivery of a suitable dry oil treatment particulate material in dry form from a vehicle directly into effective contact with waterborne spilled oil. In one aspect of the invention, the apparatus includes a base, an air compressor, a tank for holding the particulate material, a feed conduit connected for pressurization by the air compressor means and having an outlet, a downwardly directed nozzle fluid connected to the outlet and supported from the base, a feeder for feeding the particulate material from the tank into the feed conduit whereby a stream of the material, mixed with air, is directed at high velocity from the outlet, and a hanger for carrying the base by an airborne vehicle with the nozzle elevated above the surface level, the stream impacting and penetrating the oil.

The apparatus can further include a positioner for locating the outlet in a predetermined position and orientation with respect to the base, including at least one position that is at least two feet below the base. The nozzle can be movable between a proximately vertical orientation to a downwardly and forwardly directed inclination of at least approximately 30° from vertical. The positioner means can further include a boom member extending from the base, the nozzle being located proximate a free end of the boom member; a mechanism for permitting angular movement between the nozzle and the boom member, whereby the stream of the particulate material is variably oriented relative to the boom member; an actuator on one of the base means and the boom, the actuator being spaced toward the base from the nozzle and being operatively responsive to a control signal from within the vehicle; and a control member connected to the actuator and extending to proximate the downwardly directed nozzle for movably orienting the downwardly directed nozzle relative to the boom member in response to the actuator. The particulate material can include a nonagglomerating powder of pulverized polyisobutylene having a particle size ranging from approximately 100 to approximately 1000 micrometers for treating the petroleum.

In another aspect of the invention provides a method for treating an unwanted accumulation of petroleum on a body of water, the combination of the water and the petroleum having a surface level, the method including the steps of:

(a) providing a fluidic medium component, the component having properties facilitating the control and/or recovery of the petroleum upon mixture therewith;

(b) providing a dispensing apparatus including air compressor means, tank means for holding the fluidic medium component, and a conduit member having an outlet;

(c) pressurizing the conduit member from the compressor means;

(d) positioning the dispensing apparatus for maintaining the outlet of the conduit member downwardly directed at a predetermined elevation above the surface level; and (e) feeding the fluidic medium component into the conduit means from the tank means, whereby the fluidic medium component reaches the surface level at a sufficiently high velocity for direct penetration into the petroleum.

The process can also include the step of transporting the dispensing apparatus at rates between approximately 10 knots and approximately 20 knots. The process can also include the step of suspending the dispensing apparatus from a hoverable vehicle. The process can further include the step of flying the vehicle at approximately 15 knots above the combination of the water and the petroleum.

DRAWINGS

These and other features, aspects, and advantages of the present invention will become better understood with reference to the following description, appended claims, and accompanying drawings where:

FIG. 5 is a front oblique elevational perspective view of the apparatus of FIG. 1 in use cleaning a first elevated workpiece;

FIG. 6 is an elevational perspective detail view of the apparatus of FIG. 1 within region 6 of FIG. 5;

FIG. 7 is a fragmentary front elevational view of the apparatus of FIG. 1 in an alternative configuration in use cleaning a second elevated workpiece;

FIG. 8 is a fragmentary front elevational view showing an alternative configuration of the apparatus of FIG. 1 within region 8 of FIG. 7;

FIG. 9 is a fragmentary detail elevational view of the apparatus of FIG. 1 within region 9 of FIG. 2;

FIG. 10 is an oblique elevational perspective view of the apparatus of FIG. 1 in the configuration of FIG. 8, showing a nozzle actuator and provisions for alternative boom orientations;

FIG. 11a is a diagrammatic plan view of the apparatus of FIG. 10, the boom extending left from below the helicopter;

FIG. 11b is a plan view as in FIG. 11a, the boom extending forwardly from a left position below the helicopter;

FIG. 11c is a plan view as in FIG. 11a, the boom extending forwardly from a right position below the helicopter;

FIG. 12 is a fragmentary sectional plan view within region 12 of FIG. 10;

FIG. 13 is a front elevational view, showing another alternative configuration of the apparatus of FIG. 1;

FIG. 14 is an oblique elevational perspective detail of the apparatus within region 14 of FIG. 13;

FIG. 15 is an elevational perspective view of the apparatus of FIG. 1 in use applying foam to a fire FIG. 16 is a front elevational, showing another alternative configuration of the apparatus of FIG. 1;

FIG. 17 is a functional schematic diagram of a nozzle positioning portion of the system of FIG. 16;

FIG. 18 is a front oblique elevational perspective view showing an alternative configuration the apparatus of FIG. 16 in operation treating a body of water having petroleum spilled therein; and FIG. 19 is a side elevational detail view of a portion of the apparatus of FIG. 18.

DESCRIPTION

Figure 1:
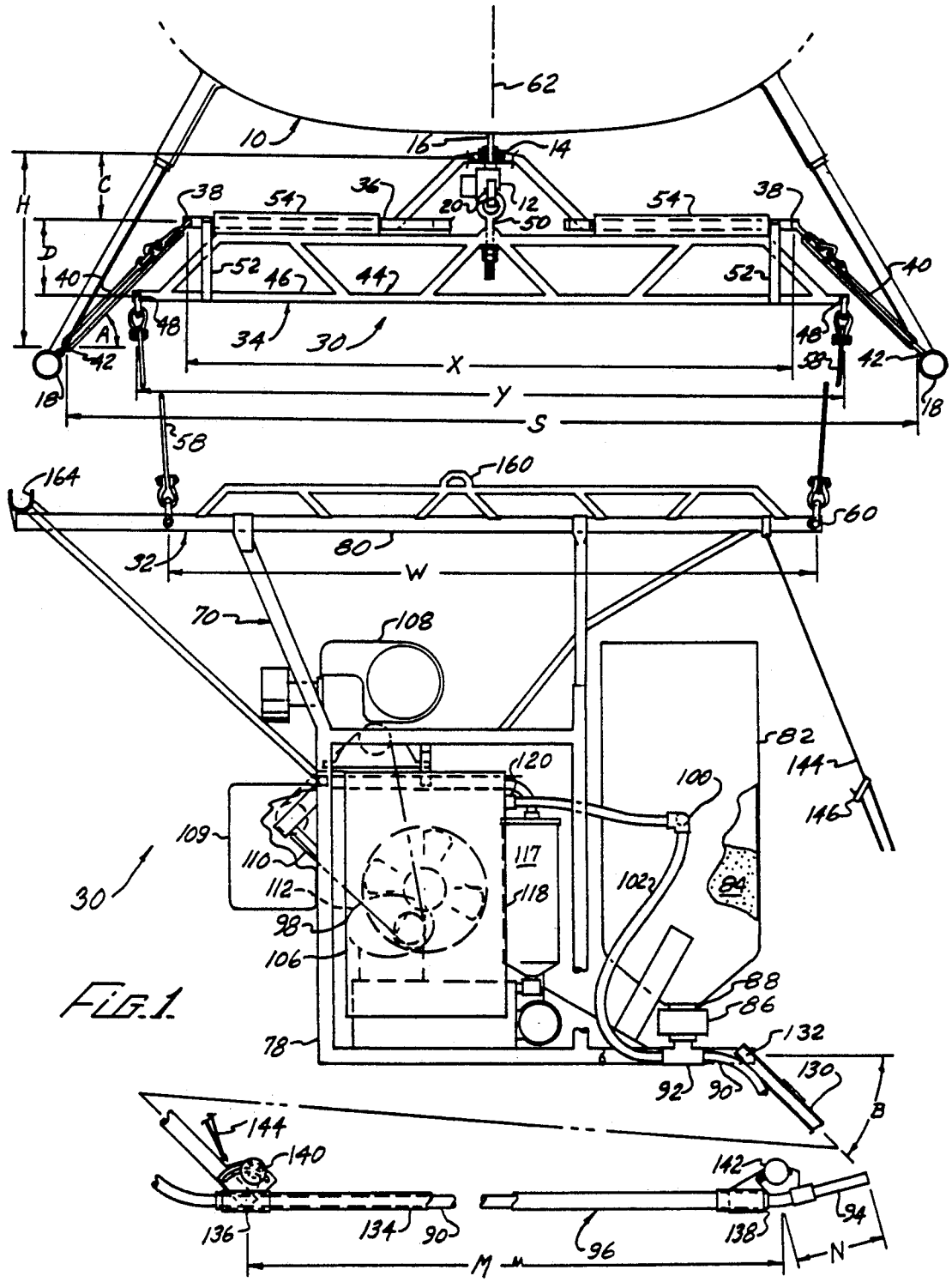
FIG. 1 is a front fragmentary sectional elevational view of a helicopter equipped with apparatus according to the present invention.

The present invention is directed to an apparatus and method for controllably positioning a load from a hoverable vehicle, and further to the application of the load in the form of a fluidic medium to an elevated or otherwise inaccessible workpiece. The medium can include an abrasive particulate for cleaning the workpiece, foam for fighting fires, or a material for treating petroleum present in a body of water for limiting environmental damage by facilitating recovery thereof. With reference to the drawings, particularly FIGS. 1-3 and 5, a helicopter or other hoverable vehicle 10 is equipped with a releasable cargo hook 12, the hook 12 being connected by an attachment bolt 14 to a cable 16, the cable 16 being attached to the vehicle 10 for suspending the hook 12 underneath the vehicle 10. The vehicle 10 is also equipped with landing gear structure in the form of a pair of skids 18, the skids 18 being located on opposite sides of a longitudinal axis 20 of the vehicle 10, the longitudinal axis 20 intersecting the hook 12. As shown in FIG. 1, the skids 18 are spaced apart by a distance S, the attachment bolt 14 being located midway therebetween and elevated therefrom vertically by a distance H.

According to the present invention, an apparatus 30 for manipulation of a load 32 includes a stabilizer unit 34 that is suspended from the hook 12 and the attachment bolt 14 as described herein. The stabilizer unit 34 includes a stabilizer bar 36 that extends horizontally on opposite sides of the hook 12 to respective bar attachment points 38, the bar attachment points 38 being spaced apart by a distance X and displaced below the attachment bolt 14 by a vertical distance C. Each of the bar attachment points 38 is biasingly connected to a respective skid 18 of the vehicle 10 by a corresponding bungee means 40, the connection of each bungee means 40 to the skid 18 defining an anchor point 42, the anchor point 42 being fixed relative to the respective skid 18. A yoke assembly 44 is suspended from the hook 12, the yoke assembly 44 including a yoke truss 46 that extends on opposite sides of the hook 12 to a pair of yoke attachment points 48, the yoke truss 46 being releasably connected to the hook 12 by an eye bolt 50, the yoke attachment points 48 being spaced apart by a horizontal distance Y and located a vertical distance D below the bar attachment points 38.

The yoke assembly 44 is held in a fixed position relative to the stabilizer bar 36 by means of spaced apart pairs of leg members 52, each pair of the leg members 52 fixably depending from the stabilizer bar 36 from proximate a respective bar attachment point 38, the leg members 52 slidably engaging opposite sides of the yoke truss 46. A pair of cushion members 54 enclose the stabilizer bar 36, each of the cushion members 54 being located proximate a pair of the leg members 52 for bearing against the top of the yoke truss 46 when the eye bolt 50 engages the hook 12. A desired degree of pressure can be maintained between the cushion members 54 and the top of the yoke truss 46 by appropriately adjusting the eye bolt 50. The attachment bolt 14, the eye bolt 50, the bar attachment points 38, and the yoke attachment points 48 each lie in a common anchor plane, designated stabilizer plane 56 in FIG. 2. The stabilizer plane 56 is nominally a vertical plane that is normal to the longitudinal axis 20 of the vehicle 10, the bungee means 40 and the anchor points 42 also being nominally located in the stabilizer plane 56.

The load 32 is suspended from the yoke assembly 44 by a pair of flexible tension members 58, each tension member 58 being connected between one of the yoke attachment points 48 and a respective load attachment point 60 of the load 32, the load attachment points 60 being spaced apart horizontally by a load attachment distance W, the distance W being approximately equal to the yoke attachment distance Y between the yoke attachment points 48. The distance Y is less than the distance S, and the distance C plus the distance D is less than the distance H for locating the stabilizer unit 34 above ground level when the vehicle 10 is at rest, and for permitting the tension member 58 to pass between the skids 18. Suitable tensioning of the bungee means 40 provides a high degree of yaw stiffness of the stabilizer unit 34 about a vertical axis 62 of the vehicle 10, the vertical axis 62 intersecting the attachment bolt 14 and, nominally, the eye bolt 50. The distance X is preferably from about 50% to about 90% of the distance S between the skids 18 for enhancing the yaw stiffness. More preferably, the distance X is between approximately 65% and approximately 75% of the distance S. Also, the distance C by which the bar attachment points 38 are displaced below the bolt 14 assures that when the stabilizer unit 34 is unloaded, the stabilizer unit 34 is effectively prevented from flopping around, the stabilizer plane 56 remaining approximately vertical. On the other hand, the distance C is made relatively small compared with the vertical distance H by which the bolt 14 is located above the skid 18 for limiting bending stresses on the stabilizer unit 34 in a horizontal direction when the vehicle 10 rotates in pitch relative to the load 32. Accordingly, the distance C is made from about 20% to about 40% of the distance H, being more preferably about 30% of the distance H. Also, an angle A is formed in the stabilizer plane 56 between each bungee means 40 and the anchor points 42, the angle A being approximately 45°.

Figure 2:
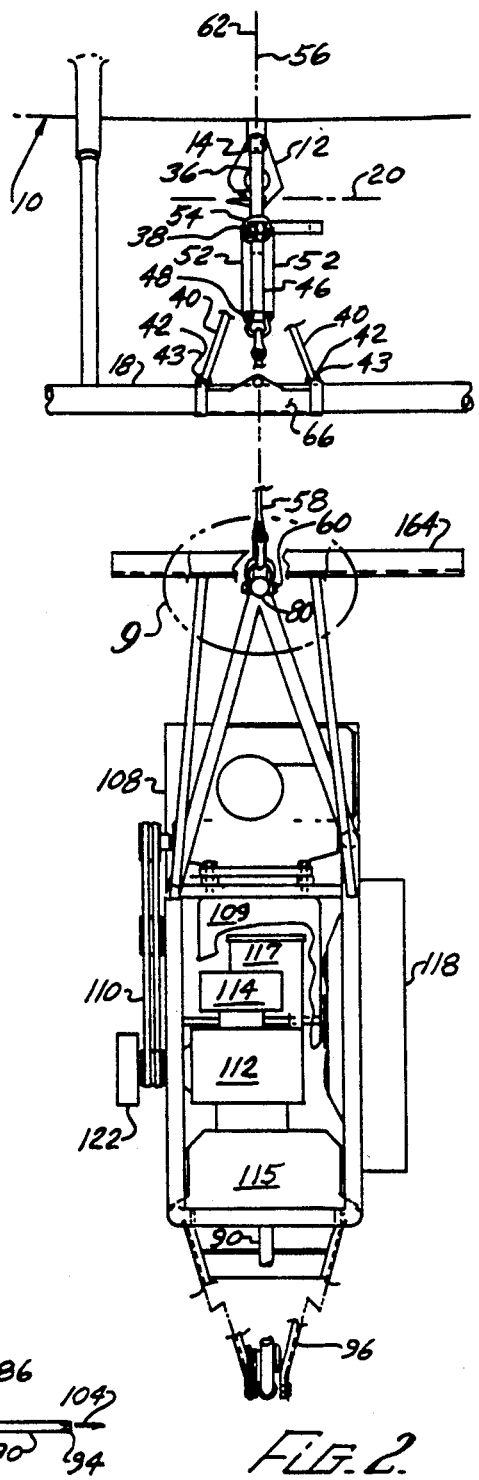
FIG. 2 is a side fragmentary sectional elevational view of the apparatus of FIG. 1.

As shown in FIG. 2, each of the anchor points 42 has two counterparts, designated anchor band 43, that are spaced apart on opposite sides of the stabilizer plane 56, each being formed as a band member that encloses the skid 18, and connecting a respective bungee means 40. Removable spacer means 66 are interposed between the bands 43 on each skid 18. This arrangement advantageously permits the bungee means 40 to be connected at reduced tension for ease of installation, and enhances the yaw stability of the stabilizer unit 34 for a given roll stiffness thereof. Further, the spacing between the bands 43 provides enhanced clearance between the bungee means 40 and the yoke assembly 44.

The combination of the roll coupling between the load 32 and the vehicle 10 with the location of the load beneath the vehicle advantageously enhances the stability of both the vehicle and the load. This is because the combined mass of the load and the vehicle is centered further below the center of thrust than is the case when the load is within the vehicle.

An important aspect of the present invention is that the load 32 can be a cleaning or dispensing module 70, the dispensing module 70 being particularly useful in the maintenance of transmission line towers such as the tower 72 shown in FIG. 5. The tower 72 serves to support a plurality of transmission lines 74, each by a respective insulator or workpiece 76, the workpiece 76 requiring periodic cleaning maintenance for removing accumulations of foreign material that would otherwise eventually produce harmful arcing between the lines 74 and the tower 72. In FIG. 5, the tower 72 supports three of the transmission lines 74 in a typical "single circuit" three-phase configuration, the respective workpieces 76 being horizontally disposed. Also, a pair of grounded sky lines 75 are supported from the top of the tower 72 for preventing circuit damage from lightning.

Figure 3:
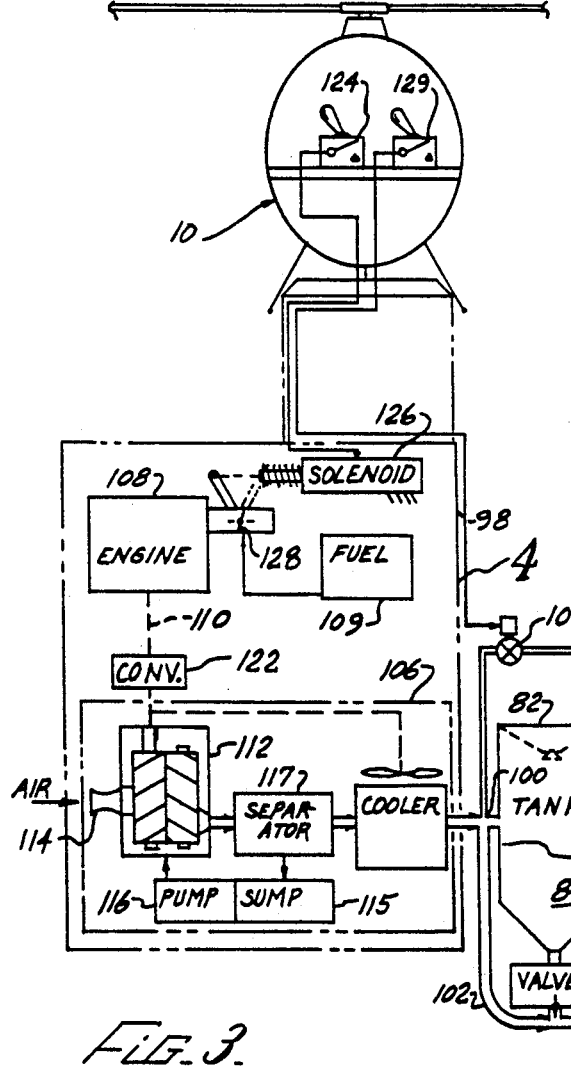
FIG. 3 is a functional schematic diagram of the apparatus of FIG. 1.

The dispensing module 70 includes a frame or base 78 having an overhead load beam 80, the load beam 80 incorporating the load attachment points 60. With further reference to FIG. 3, a tank 82 is mounted on the base 78 for carrying the cleaning medium in the form of a particulate solid material 84, a control valve 86 being connected to an outlet 88 of the tank 82 for dispensing the material 84 through a delivery line 90, the outlet 88 being located at a cone-shaped bottom extremity of the tank 82. The delivery line 90 is connected to the control valve 86 by a Tee fitting 92, and also to a nozzle 94, the nozzle 94 being mounted in a predetermined position and orientation with respect to the base 78 on a boom assembly 96. An air compressor means 98 is connected to the tank 82 by a tank fitting 100, a manifold line 102 also connecting the tank fitting 100 to the Tee fitting 92. Thus the compressor means 98 simultaneously pressurizes the tank 82 while delivering a large quantity of air at the same pressure to the delivery line 90. The tank fitting 100 is also operatively connected through a solenoid valve 101 to the control valve 86 for automatically opening the control valve 86 when the pressure at the tank fitting 100 reaches a predetermined level. Thus whenever the pressure at the tank fitting 100 is at or above the predetermined level, the material 84 is allowed to pass through the control valve 86 at a predetermined rate for mixing with the air in the delivery line 90 as long as the solenoid valve is also activated, the material 84 being ejected from the nozzle 94 with the air in a high-velocity stream 104.

In an exemplary configuration of the air compressor means 98, a screw compressor unit 106 is operatively connected to a gasoline reciprocating engine 108 by drive belt means 110, the engine 108 being fed by a fuel supply 109. The compressor unit 106 includes a quasi-positive displacement twin-screw pump 112 having an air inlet 114, an oil circulation system having a sump 115 and pump means 116, an air/oil separator 117, a fan cooler 118, and an outlet 120, the outlet 120 being connected to the tank fitting 100. A compressor unit suitable for use as the compressor unit 106 in the present invention is available as Roto Model 2A, Roto being a trademark of Bauer Compressors Inc., of Norfolk, Va. The Roto 2A compressor is capable of delivering over 120 cfm of air at 100 psi compressor discharge pressure when driven with a power input of 30 horsepower. The compressor operates with essentially positive displacement between 4000 rpm and a service maximum about 6000 rpm, there being no effective seal below 3000 rpm such that a negligible amount of power is required under idling conditions. The air flow rate ranges from about 75 cfm at 4500 rpm up to about 130 cfm at the maximum of 6000 rpm. The compressor unit 106 includes a conventional intercooler. It has been discovered that operation dispensing dry particulate is enhanced by discarding or bypassing the intercooler. It is believed that the cooling of the compressed air by the intercooler undesirably promotes vapor condensation, detrimentally effecting free flow of the particulate.

An engine suitable for use as the engine 108 in the present invention is available as Rotax Model 503 from California Power Systems of San Jose, Calif. In a single carburetor version, this engine is capable of delivering approximately 25 horsepower at 4000 rpm, 30 horsepower at 4500 rpm, 35 horsepower at 5000 rpm, 40 horsepower at 5500 rpm, and 44 horsepower at 6000 rpm. This engine, which weighs approximately 70 pounds, requires approximately 2.5 gallons per hour of fuel when producing 30 horsepower.

A torque converter unit 122 is connected between the compressor unit 106 and the drive belt means 110 for enhancing the ability of the engine 108 to deliver needed power to the pump 112 over a wide range of operating conditions. Alternatively, the drive belt means 110 produces a 1:1 drive ratio such that the speed of the engine 108 is the same as that of the pump 112. In fact, the engine 108 could be directly coupled to the pump 112, except that one of the engine 108 and pump 112 would be required to be configured for running in an opposite direction to that of the readily available models of these components noted above.

As further shown in FIG. 3, the dispensing module 70 is controlled by an air control switch 124 which is located within the vehicle 10, the switch 124 being operatively connected to a solenoid actuator 126 for controlling a throttle member 128 of the engine 108. When the solenoid actuator 126 is activated by the air control switch 124, the throttle member 128 is moved to an adjustable substantially open position for producing a predetermined high power output from the engine 108. When the solenoid actuator 126 is deactivated, the throttle member 128 moves to an idle position for operating the engine 108 in an idling condition, the idling condition being at a speed substantially below 3000 rpm, such as 1000 rpm. A media switch 129 for controlling the solenoid valve 101 is also located within the vehicle 10. Accordingly, when the solenoid actuator 126 is de-energized, there is substantially no flow of either air or the material 84 from the nozzle 94, the control valve 86 being closed in response to low air pressure at the tank fitting 100. When the solenoid actuator 126 is activated, high air pressure is obtained at the tank fitting 100, but the control valve 86 remains closed until the solenoid valve 101 is activated by the media switch 129, at which time the control valve 86 is opened and operational quantities of the material 84 are driven through the nozzle 94 with the air for producing the stream 104.

A nozzle suitable for use as the nozzle 94 is available as Super Blast model DCV-4 from Empire Abrasive Equipment Corp. of Langhorne, Pa. The DCV-4 nozzle includes a centered carbide venturi having a 0.25 inch ID, and is rated an air flow rate of 81 CFM and 494 pounds of sand flow per hour at a nozzle pressure of 100 psi, 18 horsepower being required. Other components appropriate for use as the tank 82, the control valve 86, the delivery line 90, the Tee fitting 92, and the tank fitting 100, and the manifold line 102, are similarly available from Empire Abrasive Equipment Corporation.

The boom assembly 96 includes an A-frame member 130, opposite legs thereof being pivotably joined by a pair of frame joints 132 to the base 78, an arm or boom member 134 being pivotably connected to the apex of the A-frame member 130 by an arm joint 136. The nozzle 94 is pivotally mounted to the boom member 134 remotely from the arm joint 136 by a nozzle joint 138. The boom member 134 is fabricated from an electrically non-conductive material for isolating the nozzle 94 from the A-frame member 130 and the base 78 of the dispensing module 70. Similarly, the delivery line 90 comprises an electrically non-conductive material such as rubber. As shown in the drawings, the arm member 134 is fabricated from a tube of fiberglass, the delivery line 90 being supportively located therein. The boom assembly 96 can extend from the base 78 a distance L between frame joint 132 and the arm joint 136, plus a distance M between the arm joint 136 and the nozzle joint 138, plus a distance N between the nozzle joint 138 and the end of the nozzle 94. The distance L can be about 7 feet, the distance M can be from about 3 feet to about 7 feet, and the distance N can be about 8 inches. Thus the maximum distance between the frame joint 132 and the end of the nozzle 94 is from about 11 feet to about 15 feet. The arm joint 136 and the nozzle joint 138 are fixably adjustable to predetermined relative orientations. For this purpose, the arm joint 136 is provided with an adjustable arm joint clamp 140, and an adjustable nozzle joint clamp 142. A flexible arm tension member 144 is connected to the boom assembly 96 proximate the arm joint 136 and anchored to the base 78 proximate the load beam 80, the tension member 144 being equipped with adjustment means 146 for adjustably defining an angle B of the A-frame member 130 relative to the base 78, except that the tension member 144 permits the A-frame member 130 to be pivoted upwardly about the frame joint 132 to proximately a horizontal position when the dispensing module 70 is at rest on the ground. Typically the tension member 144 is adjusted for maintaining the angle B between about 45° and about 60° for enhancing a vertical distance Z between the nozzle 94 and a rotor 22 of the vehicle 10, and for permitting the boom assembly 96 to clear obstructions associated with the tower 72.

In operation, the air switch 124 and the media switch 129 are both switched off until the vehicle 10, together with the dispensing module 70, approaches a tower 72 at which cleaning is to be done. Preferably, the air switch 124 is next turned on, activating the solenoid 126 for producing the high-pressure output of the compressor means 98 as described above. As the vehicle 10 is further maneuvered for bringing the nozzle 94 proximate the workpiece 76, the solenoid valve 101 is then activated by the media switch 129 for producing the stream 104 as also described above. Normally, the solenoid 126 is energized continuously while a full complement of the workpieces 76 of the tower 72 are cleaned. When it is desired to interrupt the stream 104 such as when moving between the workpieces 76, the media switch 129 is operated for de-energizing the solenoid valve 101. This is because the control valve 86 responds relatively rapidly to operation of the solenoid valve 101 as compared with operation of the solenoid 126, because of the time required for the engine 108 to change speeds, and for a corresponding change of air pressure in the tank 82. When the last workpiece 76 of the tower 72 has been cleaned, the solenoid 126 is deactivated by operation of the air switch 124, with a consequent savings of fuel expended from the fuel supply 109 during transit to the next tower 72.

An experimental prototype of the dispensing module 70 as described above, but without the arm joint 136, has been built and tested, the module 70 having a weight of approximately 550 pounds, the tank 82 being capable carrying approximately 150 pounds of the material 84. The tests show that prototype is operable to produce the stream 104 continuously for about 45 minutes. It is expected that by substituting slightly larger counterparts of the tank 82 and the fuel supply 109, along with a modest weight-reduction of the module 70, continuous operation for one hour or more will be possible.

It has been determined that the dispensing module 70 is effective in cleaning the workpiece 76 with the nozzle 94 positioned at an operating distance O from the workpiece, the distance O being up to about 6 feet. Typically the workpiece 76 is an elongated cylindrical insulator 150 having a spaced plurality of ring portions 152, as shown in FIG. 6. By directing the stream 104 upwardly and laterally against the ring portions 152, the material 84 is deflected thereby such that substantially all of the insulator 150 can be cleaned with the nozzle 94 positioned to one side only of the insulator 150, as shown in FIG. 6.

Figure 4:
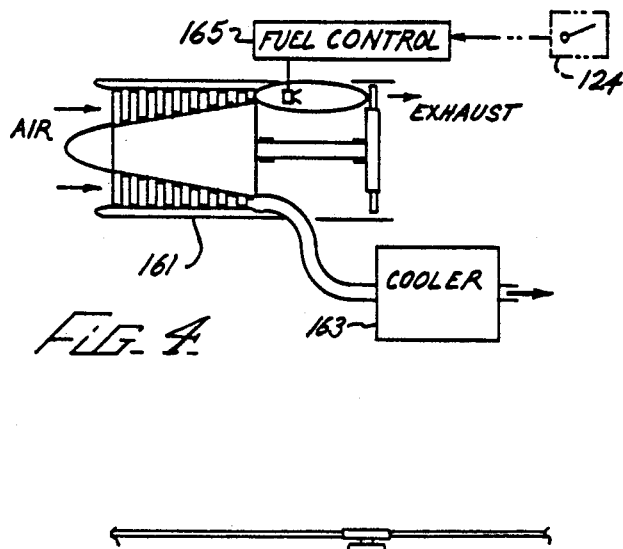
FIG. 4 is a functional schematic diagram of an alternative configuration of the apparatus of FIG. 1 within region 4 of FIG. 3.

With further reference to FIG. 4, an alternative configuration of the compressor means 98 includes a gas turbine compressor 160 and a cooler module 162, the compressor 160 being provided with a fuel control 164 that is responsive to the control switch 124. In this configuration, the dispensing module is capable of carrying a much larger payload because the weight efficiency of the compressor 160 is greatly improved over that of the compressor unit 106 and the separate engine 108.

In another important aspect of the present invention, the dispensing module 70 can be releasably carried proximate the vehicle 10 as an alternative to the vertically separated configuration that is shown in FIG. 5. As shown in FIGS. 1 and 2, and with further reference to FIG. 7, the load beam 80 of the base 78 is equipped with a hook catch 160 for engagement by the releasable hook 12, the hook 12 also being capable of closing and latching about the catch 160. The vehicle 10 is also equipped with a winch means 162 for vertically positioning the hook 12 as desired by the operator. An upwardly facing trough member 164 is rigidly attached to the load beam 80 for engaging one of the skids 18 of the vehicle 10. Thus with the stabilizer unit 34 removed, the vehicle 10 can be made to hover above the dispensing module 70, the skid 18 being guided into engagement with the trough member 164; and the hook 12, initially in its released condition, is engaged with the hook catch 160. As shown in FIG. 7, a mirror 166 is provided on the vehicle 10 for establishing a line of sight 168 between the operator and the trough member 164, the trough member 164 being located on an opposite side of the vehicle 10 from the operator. This is because the hook catch 160 is located laterally slightly to one side of a center of gravity 170 of the dispensing module 70 for producing an upward force reaction at the trough member 164 that maintains the engagement with the skid 18. It is preferred that the trough member 164 be located opposite the boom assembly 96 because the lateral offset of the hook catch 160 results in an increased extension of the boom assembly 96 beyond the rotor 22 of the vehicle 10, the boom assembly 96 being located on the same side of the vehicle 10 as the operator for facilitating effective aiming of the nozzle 94.

In this alternative configuration, the dispensing module 70 is essentially rigidly coupled proximate the vehicle 10, the vertical distance Z between the nozzle 94 and the rotor 22 being substantially reduced by at least about six feet compared with the previously described configuration shown in FIG. 5. This alternative configuration is well suited for cleaning the insulators 150 of a "dual circuit" three phase transmission tower 172 as schematically depicted in FIG. 7. As further shown in FIG. 7, the nozzle 94 protrudes a distance P laterally beyond the rotor 22 of the vehicle 10. Typically, the rotor 22 can have a radius R of approximately 13.2 feet. In an exemplary configuration of the present invention, the distance P is preferably between about 7 feet and 8 feet.

With further reference to FIG. 8, another alternative configuration is provided by having two of the trough members 164 at opposite ends of the load beam 80, each of the trough members 164 engaging a respective skid 18. In this configuration, the hook catch 160 is centrally located between the load attachment points 60, and between the trough members 164. The mirror 166 is not required in this configuration because the line of sight 168 can be between the operator and the trough member 164 on the same side of the vehicle 10. Suitable precautions, however, must be taken to prevent the winch means 162 from raising the hook 12 above a level required for the engagement of the trough members 164 with the skid 18. Otherwise, the load beam 80 would be subject to bending by excessive upward movement of the hook 12. Suitable protection can be provided by a conventional limit stop means (not shown) that is operatively connected to the winch means 162. With further reference to FIG. 9, a curve-shaped alternative configuration of the trough member 164 permits a rocking motion between the trough member 164 and the skid 18 for allowing the vehicle 10 to pitch relative to the dispensing module 70.

With further reference to FIGS. 10 and 11, the boom assembly 96 extends to the left from below the vehicle as described above, and as shown in FIG. 11a. In further accordance with the present invention, the base 78 of the dispensing module 70 is provided with a first pair of joint mounts, designated 174a and 174b in FIG. 10, for mounting the boom assembly 96 with the nozzle 94 extending forwardly below the vehicle 10, laterally positioned left of a longitudinal axis 175 of the vehicle 10, as shown in FIG. 11b. The forwardly extending orientation of the boom assembly 96 is advantageous in that minor adjustment of the vertical position of the nozzle 94 is very conveniently accomplished by corresponding movements in the pitch attitude of the vehicle 10, the nozzle 94 being in the natural field of view ahead of the pilot when the vehicle 10 is piloted from a left seat (not shown). Similarly, an additional pair of joint mounts, designated 174c and 174d in FIG. 10, are provided on the base 78 opposite the mounts 174a and 174b for connecting the boom assembly 96 as shown in FIG. 11c. In the configuration of FIG. 11c, the dispensing module 70 is turned end for end relative to the vehicle 10, the boom assembly 96 extending forwardly from beneath the vehicle 10, the nozzle 94 being in the natural field of view ahead of the pilot when the vehicle 10 is piloted from a right seat (not shown). As further shown in FIG. 10, the base 78 of the dispensing module 70 is provided with the trough members 164 as described above in connection with FIG. 8, the winch means 162 being mounted to the load beam 80 of the dispensing module 70 instead of to the vehicle 10, for avoiding problems related to certification of the vehicle 10 by relevant governing authorities. Preferably the winch means 162 has an air motor drive powered by the compressor means 98. Conventional winch means having such air motor drives are available from a variety of sources.

With further reference to FIG. 12, an alternative and preferred configuration of the boom assembly 94 includes means 176 for remotely positioning the nozzle 94 relative to the boom member 134, the positioning means 176 being operated by actuator means 178. The actuator means 178 is located at a distance from the nozzle 94 for reducing a polar movement of inertia of the dispensing module 70 about the vertical axis 62 controlled from within the vehicle 10 by a joystick control 180, shown diagrammatically in FIG. 12 as being incorporated in a pilot's kneepad 182, the kneepad 182 also incorporating the air control switch 124 and the media switch 129. The signals between the kneepad 182 and the dispensing module 70 are preferably carried by an umbilical cord 184 as further shown in FIG. 12, the umbilical cord passing directly from within the vehicle 10 to the dispensing module 70 without connecting the stabilizer unit 34 for facilitating manipulation of the module 70 relative to the vehicle 10.

The positioning means 176 includes a spaced plurality of nozzle arm members 186 rigidly extending radially from the nozzle 94 for selectively urging the nozzle 94 out of alignment with the boom member 134 as described herein, the arm members 186 including an orthogonal pair of upper arm members 186a and corresponding lower arm members 186b. As shown in FIG. 12, the delivery line 90 is slightly flexible, the nozzle 94 being coupled directly thereto by threaded engagement with a nozzle sleeve 188, the nozzle sleeve 188 also threadingly gripping an end portion 190 of the delivery line 90, the boom member 134 terminating short of the nozzle sleeve 188, a clamp 191 being applied to the boom member 134 for maintaining a desired spacing from the nozzle sleeve 188. As further shown in FIG. 12, the nozzle arm members 186 extend rigidly from the nozzle sleeve 188 such as by being formed integrally therewith. A control rod 192 is pivotally connected to the outer end of each nozzle arm member 186 by means of a swivel rod end 194 and associated clevis pin 196, the control rods being designated upper control rods 192a and lower control rods 192b, respectively connecting the upper nozzle arm members 186a and the lower nozzle arm members 186b. Each control rod 192 extends along the boom assembly 96 and into responsive engagement with the actuator means 178, whereby opposite axial movements of diagonally opposing control rods 192a and 192b produce a corresponding flexure of the delivery line 90. The control rods 192 are located in spaced relation to the boom member 134 by one or more guide assemblies 198, each guide assembly 198 having a guide member 200 in axially sliding engagement with each of the control rods 192, the control rods 19 also being slightly flexible for permitting the desired movement of the nozzle 94 relative to the boom member 134. The range of orientations of the nozzle 94 relative to the boom member 134 is asymmetrically disposed above alignment with the boom member 134 because of the need for the stream 104 to be inclined nominally upwardly as discussed above. Accordingly, the upper arm members 186a extend in a plane generally normal the nozzle 94, while the lower arm members 186b are inclined slightly rearwardly as shown most clearly in FIG. 12.

In an exemplary configuration of the present invention, the actuator means 178 includes a frame member 202 rigidly mounted to the boom assembly 96, a pair of levers 204 each pivotally connected to the frame member 202, opposite ends of each lever 204 being also pivotally connected to respective opposing ones of the control rods 192 by further counterparts of the rod ends 194 and clevis pins 196.

Each of the levers 204 is coupled to a control actuator 206 for operation thereby, the actuators 206 being responsively connected to the joystick control 184 using methods known in the art of actuators. For example, the actuators 206 can incorporate motor-driven lead screws, appropriate electrical connections being made between the joystick control 184 and the actuators 206, and to a suitable source of electrical power. Preferably, the actuators 206 each include a pneumatic cylinder and appropriate control valves, the control valves being fluid-connected to the outlet 120 of the compressor means 98. In this preferred configuration, the compressor means 98 provides a most convenient source of power for the actuator means 178. It will be understood that the actuator means 178 need not be powered when the engine 108 thereof is being operated at idle.

With further reference to FIGS. 13 and 14, another preferred configuration of the apparatus 30 includes the trough member 164 at each end of the load beam 80 for rigidly coupling the dispensing module 70 to the skids 18 of the vehicle 10 as in FIG. 8, above, the boom assembly 96 also incorporating the positioning means 176 for the nozzle 94. The winch means 162 is mounted to the load beam 80 of the base 78, in a similar location between the load attachment points 60 as in FIG. 10. In this configuration, however, a pair of winch lines 218 movably extend from the winch means 162, each winch line 218 passing through a snatch block 220 that is connected to the base 78 proximate a respective one of the load attachment points 60, the line 218 being connected to one of the yoke attachment points 48 of the stabilizer unit 34. Thus the dispensing module 70 can be suspended below the vehicle 10 from the stabilizer unit 34, the winch lines 218 functioning as the tension members 58 as described above in connection with FIGS. 1 and 5. Also, the module 70 can be moved according to the present invention between the position shown in FIG. 5 and the rigidly coupled configuration of FIG. 8 by operation of the winch means 162, even while the vehicle 10 is airborne. Moreover, the vertical distance Z between the nozzle 94 and the rotor 22 is adjustable during flight for optimally selecting the distance Z according to the environment of each workpiece 76.

In operational experiments with the prototype apparatus, it has been found desirable to increase the distance P (See FIG. 7) by which the nozzle 94 extends beyond the rotor 22. It has also been found that the effectiveness of the stabilizer unit 34 is greatly enhanced by limiting a polar moment of inertia of the dispensing module 70 about the vertical axis 62 of the vehicle 10. Further, experience with the previously tested prototype of the delivery module 70 has shown that excessive flexibility of the boom assembly 96 is detrimental to precise control of the delivery stream 104 from the nozzle 94. Accordingly, the apparatus 30 preferably includes a lightweight, elongate and particularly stiff form of the boom assembly 96 as further shown in FIG. 13. This configuration of the boom assembly 96 includes a plurality of guy wires 222 that are anchored proximate opposite ends of the boom member 134 for supporting a spider frame 224, the frame 224 being mounted approximately midway along the boom member 134. This preferred configuration of the boom assembly 96 can extend a distance E of approximately 18 feet between the base 78 and the nozzle 94, an increase of from 3 to 7 feet over what was previously believed practical. Moreover, the nozzle 94 is preferably made primarily from a plastic material for reduced mass as compared with the DCV-4 nozzle that is discussed above. A lightweight nozzle suitable for use as the nozzle 94 is available as Model SSR-4 nozzle from Clemco Industries of San Francisco, Calif.

As more clearly shown in FIG. 14, the control actuators 206 of the actuator means 178 are mounted to the spider frame 224. In the configuration of FIGS. 13 and 14, the actuators 206 are each connected for directly operating one of the control rods 192, the opposite control rod 192 being operated by a control lever 226, each control lever 226 being pivotally mounted relative to the boom member 134. The control levers 226, together with the associated guide members 200 and control actuators 206, are spaced apart a short distance along the boom member 134 for preventing interference between the control levers 226. A prototype of the boom assembly 96 as thus configured, including the delivery line 90, was found to have a weight of approximately 30 pounds.

In a further enhancement of the dispensing module 70, an enlarged prototype of the tank 82 has been fabricated by winding a high-strength carbon filament material over an aluminum mandrel for providing improved payload capacity of the dispensing module 70 at a given gross weight thereof. The tank 82 was so constructed using a proprietary process of Hitco, of Los Angeles, Calif. This modified configuration of the tank 82 weighs only 40 lbs., yet has a capacity of 4 cubic feet, and is capable of withstanding the full pressure output of the compressor means 98, up to 125 psi. The new tank 82, which has been successfully tested to withstand 500 psi, is 90 lbs. lighter than the first prototype, with 33 percent larger volume. Although opposite ends of this improved tank 82 are hemispherical, a cone-shaped insert (not shown) is provided within the bottom portion of the tank 82 for facilitating egress of the particulate material 84 as in the configurations of FIGS. 1–13.

With further reference to FIG. 15, the apparatus 30 of the present application is adapted for controlled delivery of expanded water or foam 230 for extinguishing a remote or otherwise inaccessible fire 232. For this purpose, the tank 82 of the dispensing module 70 is filled with water, the water being mixed with a small quantity of a suitable foaming agent. It has been discovered that without modification, the apparatus 30 as described above is capable of generating and delivering the foam 230 in controlled, effective quantities that are accurately positioned. The dispensing module 70, being suspended below the vehicle 10 from the stabilizer unit 34, is controllably oriented as described above, the boom assembly 96 being spaced well below the vehicle 10, and extending to one side for avoiding damage to the vehicle 10 that might otherwise result from the heat of the fire 232. Moreover, the foam 230 can be quickly aimed at selected portions of the fire 232 by operation of the positioning means 176. Thus the apparatus 30 is particularly cost-effective, being suitable for cleaning and other maintenance of tower structure components as well as for fighting fires.

It has been discovered further that improved operation for generating the foam 230 is achieved by removing the nozzle 94 from the nozzle sleeve 88, and by increasing to 1.25 inches the inside diameter of the delivery line 90, an 0.75 inch inside diameter being sufficient for cleaning applications. This modification is practical with only a slight increase of the outside diameter of the delivery line 90, and with no increase in weight. Also, the larger inside diameter is compatible with the cleaning operations. Accordingly, the dispensing module 70 is preferably configured with the larger delivery line 90, the nozzle 94 being adapted with an appropriately larger entrance cone for efficient acceleration of the material 84. Thus conversion from the cleaning configuration to a preferred foam delivery configuration is possible by the simple removal of the nozzle 94. A hose suitable for use as the delivery line 90 as thus described is available as type SUPA lightweight blast hose from Clemco Industries, above.

With further reference to FIGS. 16 and 17, a new prototype of the dispensing module 70 has been incorporated in the apparatus 30. In this new and preferred configuration, the module 70 includes the new prototype tank 82, described above, the boom assembly 96 having slightly modified versions of the nozzle positioning means 176 and the actuator means 178. As shown in FIG. 16, the positioning means 176 is configured for providing a maximum nozzle up-angle U of 80° and a maximum nozzle down-angle V of 10°. For this result, it was found advantageous to modify the actuator means 178 to provide a separate control actuator 206 for each of the control rods 192. Each of the control actuators 206 has a linear travel T of approximately 10 inches, and the lower nozzle arm members 186b are inclined rearwardly abut 45°. In this configuration, the levers 206 (FIG. 12), or the levers 226 (FIG. 13) are omitted. Suitable control of the control actuators 206 is provided as shown in FIG. 17, the control actuators 206 being designated therein as UL, UR, DL, and DR. The control actuators 206, being configured as a double-acting pneumatic cylinder having an inside diameter of approximately 0.75 inch, are operatively connected to corresponding 4-way valves 228. The 4-way valves 228 are manifolded to the compressor means 98 for providing a convenient source of air for moving the nozzle 94. the air being directed in response to separate valve solenoid signals 230 for selectively extending or retracting the associated control actuator 206. The valve solenoid signals 230 are generated by a nozzle logic circuit 232 in response to the joystick control 180. In FIG. 17, the joystick control 180 is configured as a single pole double-throw, center off, switch 234 for controlling vertical movements of the nozzle 94, and a similar but separate switch 236 for controlling horizontal movements of the nozzle 94. Also, the 4-way valves 228 are configured for blocking the path between the source of air pressure and the respective control actuators 206 when neither of its valve solenoid signals 230 are activated.

As further shown in FIG. 16, the arm tension member 144 is implemented by boom actuator means 238 for raising and lowering the boom assembly 96 in response to remote control from the kneepad 182 (see FIG. 12). The boom actuator means 238 includes a pneumatic actuator 240 pivotally connected between the A-frame member 130 and the load beam 80, the actuator 240 having an inside diameter of approximately 1.5 inches and a travel of approximately 24 inches. The actuator 240 is controlled by another of the 4-way valves 228 (not shown), this valve 228 being directly responsive to a counterpart of the single pole double-throw, center off, switch 234 (also not shown). The boom actuator means 238 is capable of moving the boom assembly 96 between an approximately horizontal position and downwardly inclined position, the angle B between the A-frame member 130 and the base 78 being up to approximately 45°.

In this new prototype of the dispensing module 70, the torque converter 122 has been replaced by a centrifugal clutch 242 for a further reduction in weight, the centrifugal clutch 242 momentarily isolating the pump 112 from the engine 108 when the air control switch 124 is activated as described above. The isolation facilitates acceleration of the engine 108 in that a momentary high torque requirement is presented by the pump 112 in a transition from idle to high rpm operation. Also, the fuel supply 109 has been relocated to below the compressor means 98 for a further reduction in the polar moment of inertia, and for limiting movement of the center of gravity 170 during operation of the apparatus 30. The control valve 86 is a Model PVR 04319 grit valve, available from Clemco Industries, above. The total dry weight of the module 70, including the boom assembly 96 is approximately 642 lbs.

With further reference to FIGS. 18 and 19, an alternative configuration of the dispensing module 70 is operable with the nozzle 94 directed vertically downwardly. This configuration is particularly advantageous for dispensing a dry particulate counterpart of the material 84 for treating waterborne spilled petroleum, designated oil 250. Once treated as described herein, the oil 250 is more easily contained and/or collected, in that the oil 250 is transformed into a more buoyant and more viscous mass. One material that desirably combines with waterborne petroleum in such a manner is ELASTOL ™ pulverized polyisobutylene (PIB) from General Technology Applications, Inc., of Manassas, Va. The polyisobutylene is processed by cryogenically crushing to particle sizes between about 100 and 1000 micrometers, then coated with tricalcium phosphate for obtaining a nonagglomerating powder.

As discussed above in the Background section, previous experiments in dispensing this material from a helicopter were unsuccessful because a large proportion of the material was carried away from the target area by the wind, much of the remainder failing to effectively combine with the oil because it floated on the oil or the water without mixing with the oil. It has been unexpectedly been discovered that the PIB material, used dry as the material 84, is effectively combined with the oil 250 when dispensed downwardly at high velocity from the nozzle 94 according to the present invention, the nozzle 94 having a nozzle height h of approximately 10 feet or less above a surface level 252 of a body of water 254 having the oil 250 therein. More particularly, the material 84 is driven to an initial penetration depth d below the level 252, the depth d being preferably at least approximately 0.5 inch when a thickness t of the oil 250 is at or greater than approximately 1.0 inch. Further, a portion of the oil 250, having a thickness t' and that is submerged by a displacement e, is also penetrated by particles of the material 84.

Satisfactory operation of the module 70 for this purpose is believed to be attained at compressor pressures ranging from 80 psi to over 100 psi, and air flow rates from about 100 cfm to about 150 cfm. Using the SSR-4 nozzle (having a venturi diameter of 0.25 inch), approximately 10 pounds of the material 84 is dispensed per hour at 100 psi and 130 cfm air flow rate. Preferably, the vehicle 10 moves forwardly at rates between approximately 10 knots and approximately 20 knots, more preferably about 15 knots. Under these conditions, a preferred range of the height h is between about 5 and about 10 feet. More preferably, the height h is held to between about 7 and about 8 feet, the depth d to which the particles of the material 84 are driven into the oil 250 being approximately 0.5 inch. When the thickness t of the oil 250 is on the order of 6 inches, the nozzle height h is preferably reduced to approximately 4 feet for increasing the penetration depth d to approximately 3.0 inch.

Preferably the initial penetration depth d is to approximately half of the thickness t, for promoting early dispersion of the material 84 throughout the thickness t. Similarly, when the oil 250 is submerged, the depth d is preferably e plus half of t'. Further mixing of the material 84 with the oil 250 is accomplished by Brownian movement, and by wave action, the oil 252 also combining with the PIB of the material 84 such as by the formation of Van der Waals molecular bonds.

As shown in FIG. 18, the nozzle 94 is lowered below alignment with the boom member 134 by a down angle $\theta$, the angle $\theta$ plus the angle B of the boom assembly 96 being approximately 90°. In this configuration of the module 70, the 60° or 80°. At least one prototype of the module 70 has been constructed with the boom assembly generally as shown in FIGS. 12-16, but with the maximum up and down-angles U and V (as well as the maximum left and right angles) being approximately 80°, the upper and lower arm members 186a and 186b being symmetrically inclined about the nozzle 94. Thus the vertical orientation of the nozzle is achievable with the boom angle B being at least 10°. Preferably the angle B is increased to between approximately 30° and approximately 45° for reducing the curvature of the end portion 190 of the delivery line 90 that would otherwise present some restriction of the flow. This greater declination of the boom assembly also increases the vertical distance Z between the nozzle 94 and the rotor 22, thereby tending to prevent turbulence from the rotor 22 from extending to the vicinity of the nozzle 94, especially when the vehicle 10 is underway. In the configuration of FIGS. 18 and 19, the boom assembly extends to one side of the vehicle 10, which normally is making forward headway. Thus the turbulence reaches downwardly as far as the nozzle 94 only after it passes aft of the nozzle 94. Accordingly, the nozzle 94 is exposed to the (forward) air speed of the vehicle 10. It is believed that optimal (maximum) penetration is achieved by directing the nozzle 94 slightly forwardly by an angle $\theta$ from vertical. In practice, the angle $\theta$ can be adjusted while the pattern of the material 84 is observed striking the oil 250, the desired adjustment being a function of the nozzle height h and the forward speed of the vehicle 10. When the boom angle B is in the preferred range of 30° to 45°, the angle $\phi$ is adjustable from approximately 60° (forward) to approximately $-60°$ (rearward). It is expected that the desired adjustment of the angle $\phi$ is in the range of $\pm 20°$.

Although the present invention has been described in considerable detail with reference to certain preferred versions thereof, other versions are possible. For example, the vehicle 10 can be a power boat or other watercraft instead of a helicopter in petroleum clean-up operations. Also, the vehicle 10 can be any hovercraft. Therefore, the spirit and scope of the appended claims should not necessarily be limited to the description of the preferred versions thereof.

What is claimed is:

1. A process for treating an unwanted accumulation of petroleum on a body of water, the combination of the water and the petroleum having a surface level, the process comprising the steps of:
   (a) providing a fluidic particulate medium component, the component having properties facilitating the control and/or recovery of the petroleum upon mixture therewith;
   (b) providing a dispensing apparatus comprising:
   (c) air compressor means;
   (d) tank means for holding the fluidic medium component; and
   (e) a conduit member having a nozzle, the nozzle defining an outlet of the conduit member;
   (f) pressurizing the conduit member from the compressor means;

(g) positioning the dispensing apparatus for maintaining the outlet of the conduit member downwardly directed at a predetermined elevation above the surface level; and (h) feeding the fluidic medium component into the conduit means from the tank means for producing a stream of particulate material having a downward nozzle velocity component, the downward nozzle velocity component being sufficient in combination with the predetermined elevation of the outlet of the conduit member that the fluidic medium component reaches the surface level at a sufficiently high downward velocity for direct penetration into the petroleum, a substantial portion of the particulate material being directly driven into the petroleum to a depth of at least approximately 0.5 inch.

2. The process of claim 1, further comprising the step of controllably pressurizing the tank means for controlling the rate of flow of the fluidic medium through the outlet.

3. The process of claim 2, wherein the step of controlling the air pressure comprises the step of controlling a source of power for the air compressor.

4. The process of claim 3, wherein the step of controlling the power comprises the steps of selectively powering the air compressor means at a first high level, for producing the stream; and powering the air compressor means at a second low power level for preventing the stream.

5. The process of claim 1, further comprising the step of transporting the dispensing apparatus at rates between approximately 10 knots and approximately 20 knots.

6. The process of claim 5, further comprising the step of suspending the dispensing apparatus from a hoverable vehicle.

7. The process of claim 6, further comprising the step of flying the vehicle at approximately 15 knots above the combination of the water and the petroleum.

8. The process of claim 1, wherein the apparatus further comprises a control valve between the tank means and the outlet, the method further comprising the step of operating the control valve for selectively preventing the flow of the fluidic medium through the outlet.

9. The process of claim 1, wherein the fluidic medium component comprises a nonagglomerating powder comprising pulverized polyisobutylene having a particle size ranging from approximately 100 to approximately 1000 micrometers for treating the petroleum.

10. The process of claim 1, wherein the predetermined elevation of the outlet of the conduit is between approximately 4 feet and approximately 10 feet.

11. The process of claim 10, wherein the elevation is between approximately 7 feet and approximately 8 feet.

12. The process of claim 10, wherein the elevation is approximately 4 feet, a substantial portion of the particulate material being directly driven into the petroleum to a depth of at least approximately 3.0 inches.

* * * * *